(12) United States Patent
Weldon et al.

(10) Patent No.: US 6,668,807 B2
(45) Date of Patent: Dec. 30, 2003

(54) EVAPORATIVE EMISSION CONTROL SYSTEM INCLUDING A FUEL TANK ISOLATION VALVE

(75) Inventors: Craig Weldon, Chatham (CA); Alfred Schneider, Blenheim (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/923,792

(22) Filed: Aug. 8, 2001

(65) Prior Publication Data

US 2002/0088441 A1 Jul. 11, 2002

Related U.S. Application Data

(60) Provisional application No. 60/223,760, filed on Aug. 8, 2000, provisional application No. 60/232,348, filed on Sep. 14, 2000, and provisional application No. 60/237,879, filed on Oct. 4, 2000.

(51) Int. Cl.$^7$ .............................................. F02M 33/02
(52) U.S. Cl. .................... 123/520; 123/516; 137/587
(58) Field of Search ................... 123/520, 519, 123/518, 516, 521, 198 D; 137/587

(56) References Cited

U.S. PATENT DOCUMENTS

| | | | | |
|---|---|---|---|---|
| 4,483,369 A | | 11/1984 | Akagi et al. ............ 137/625.12 |
| 5,259,355 A | * | 11/1993 | Nakashima et al. ......... 123/520 |
| 5,390,703 A | | 2/1995 | Tengesdal ................... 137/629 |
| 5,605,177 A | * | 2/1997 | Ohashi et al. ............... 137/587 |
| 5,629,660 A | | 5/1997 | Kenyon et al. .............. 335/227 |
| 5,657,962 A | * | 8/1997 | Neron et al. ............. 251/129.15 |
| 6,003,499 A | * | 12/1999 | Devall et al. ................ 123/520 |
| 6,021,997 A | | 2/2000 | Hell ........................ 251/30.04 |
| 6,152,115 A | * | 11/2000 | Busato et al. ............... 123/520 |
| 6,220,229 B1 | * | 4/2001 | Kawamura et al. ......... 123/520 |
| 6,289,929 B1 | * | 9/2001 | Takeuchi et al. ............ 137/587 |
| 6,325,052 B1 | * | 12/2001 | Mashiki ...................... 123/520 |

* cited by examiner

*Primary Examiner*—Carl S. Miller

(57) ABSTRACT

A system and method for controlling evaporative emissions of a volatile fuel. The system preferably has a fuel vapor collection canister, a purge valve, an isolation valve, and a fuel tank. The fuel vapor collection canister includes a supply port and a discharge port. The purge valve includes an inlet port and an outlet port. The inlet port of the purge valve is in fluid communication with the discharge port of the fuel vapor collection canister. The isolation valve includes a housing, a valve body, and a seal. The housing has a first port in fluid communication with the supply port of the fuel vapor collection canister, a second port, and a fuel vapor flow path that extends between the first and second ports. The valve body is movable with respect to the housing along an axis between a first configuration and a second configuration. The first configuration permits substantially unrestricted fuel vapor flow between the first and second ports, and the second configuration substantially prevents fuel vapor flow between the first and second ports. The seal, which is located at an interface between the housing and the valve body, includes an annular lip that projects obliquely toward the axis in the first configuration. The fuel tank is in fluid communication with the second port of the isolation valve. Thus, the fuel tank can be isolated from the fuel vapor collection canister while purging the fuel vapor collection canister.

25 Claims, 3 Drawing Sheets

EVAPORATIVE EMISSION CONTROL SYSTEM INCLUDING A FUEL TANK ISOLATION VALVE

CLAIM FOR PRIORITY

This application claims the benefit of the earlier filing dates of U.S. and Provisional Applications Nos. 60/223,760 (filed Aug. 8, 2000), No. 60/232,348 (filed Sep. 14, 2000), and 60/237,879 (filed Oct. 4, 2000), which are hereby incorporated by reference in their entirety. This application also claims the benefit of U.S. patent application Ser. No. 09/863,756 (filed May 24, 2001).

FIELD OF THE INVENTION

This disclosure generally relates to a system and method for controlling evaporative emissions of a volatile fuel such that a fuel tank can be isolated from a fuel vapor collection canister while purging the fuel vapor collection canister.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling onboard refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislated standard.

It is believed that there is needed to provide a valve that overcomes the drawbacks of orifice structures and diaphragm-actuated pressure relief valves.

SUMMARY OF THE INVENTION

The present invention provides a system for controlling evaporative emissions of a volatile fuel. The system includes a fuel vapor collection canister, a purge valve, an isolation valve, and a fuel tank. The fuel vapor collection canister includes a supply port and a discharge port. The purge valve includes an inlet port and an outlet port. The inlet port of the purge valve is in fluid communication with the discharge port of the fuel vapor collection canister. The isolation valve includes a housing, a valve body, and a seal. The housing has a first port in fluid communication with the supply port of the fuel vapor collection canister, a second port, and a fuel vapor flow path that extends between the first and second ports. The valve body is movable with respect to the housing along an axis between a first configuration and a second configuration. The first configuration permits substantially unrestricted fuel vapor flow between the first and second ports, and the second configuration substantially prevents fuel vapor flow between the first and second ports. The seal, which is located at an interface between the housing and the valve body, includes an annular lip that projects obliquely toward the axis in the first configuration. The fuel tank is in fluid communication with the second port of the isolation valve.

The present invention also provides a system for controlling evaporative emissions of a volatile fuel. The system includes a fuel vapor collection canister, a purge valve, a fuel tank, and means for isolating the fuel tank from the purge valve. The fuel vapor collection canister includes a supply port and a discharge port. And the purge valve includes an inlet port and an outlet port. The inlet port of the purge valve is in fluid communication with the discharge port of the fuel vapor collection canister.

The present invention also provides a method for controlling evaporative emissions of a volatile fuel. The volatile fuel is stored in a fuel tank and is combusted in an internal combustion engine. The method includes accumulating fuel vapor in a fuel vapor collection canister; providing an isolation valve in a first conduit, providing a purge valve in a second conduit, and isolating the fuel tank from the fuel vapor collection canister while purging the fuel vapor collection canister. The first conduit provides fuel vapor communication between the fuel tank and the fuel vapor collection canister. The second conduit provides fuel vapor communication between the fuel vapor collection canister and the internal combustion engine. The isolating includes the isolation valve substantially preventing fuel vapor flow through the first conduit. And the purging includes the purge valve permitting generally unrestricted fuel vapor flow through the second conduit.

BRIEF DESCRIPTIONS OF THE DRAWINGS

The accompanying drawing, which is incorporated herein and constitutes part of this specification, illustrates an embodiment of the invention, and, together with the general description given above and the detailed description given below, serves to explain the features of the invention.

DETAILED DESCRIPTION OF THE PREFERRED EMBODIMENT

Figure 1:
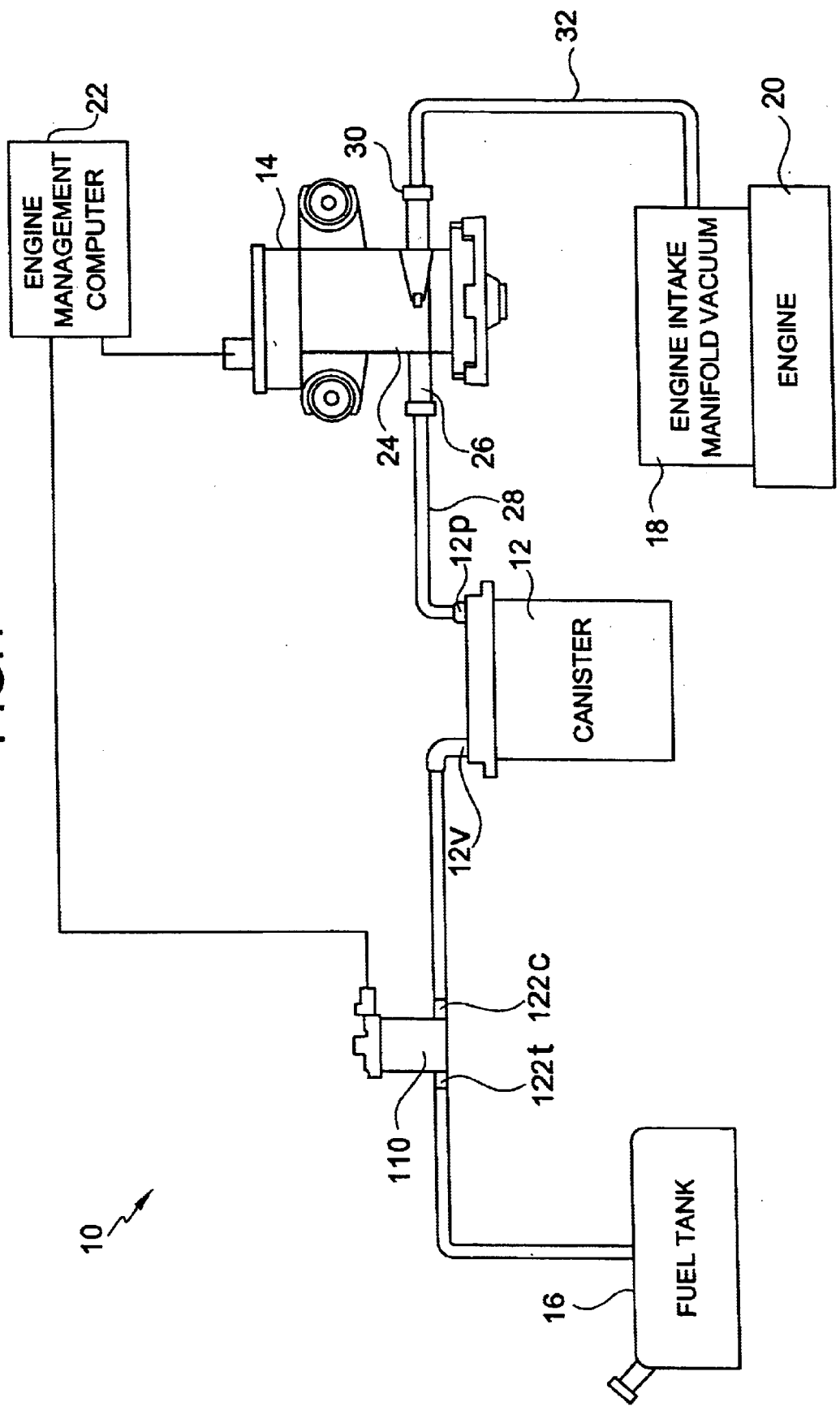
FIG. 1 is a schematic illustration of an evaporative emission control system including a fuel tank isolation valve.

Referring initially to FIG. 1, an evaporative emission control system 10, e.g., for a motor vehicle, includes a fuel vapor collection canister 12, e.g., a carbon or charcoal canister, and a canister purge solenoid valve 14 connected in series between a fuel tank 16 and an intake manifold 18 of an internal combustion engine 20. An engine control management computer 22 supplies a purge valve control signal for operating canister purge solenoid valve 14.

The seal 150' is located at an interface between the body 122' and the valve 140'. The seal 150' includes and annular extension 152' the projects obliquely with respect to the axis A' in the open position. The annular extension 152' is preferably shaped as a hollow frustum. As shown, the annular extension 152' can include a transverse dimension that is generally constant with respect to the projection of the annular extension 152'. The annular extension 152' can alternatively include a transverse dimension that tapers (not shown) with respect to the projection of the annular extension 152'. In the case of the hollow frustum, an inner surface 154' of the hollow frustum generally confronts the axis A', and an outer surface 156' of the hollow frustum generally faces opposite the inner surface 154'. The inner surface 154' is in fluid communication with the inlet port 122t' when the valve 140' is at the intermediate position. The out surface 156' is in fluid communication with the outlet port 122c' when the valve 140' is at the intermediate position. When the inlet pressure is greater than the outlet pressure, the seal 150' is self-energizing between the intermediate and closed positions. Preferably, the seal 150' closely approaches or initially contacts the sealing surface 122s' of the body 122' in the closed and intermediate positions. The seal 150' deforms in response to a differential between the first and second pressure levels, such that at the intermediate position, there is a restricted, i.e., reduced, flow between the first and second ports 120', 122'. The deforming of the seal 150' can include fluttering in response to the differential between the inlet and outlet pressure levels. The seal 150' is preferably molded on the valve 140', but can be included multiple pieces affixed to the valve 140' or the sealing surface 122s'.

The canister purge solenoid valve 14 can be used to purge free hydrocarbons that have been collected in the fuel vapor collection canister 12. The free hydrocarbons that are purged from the fuel vapor collection canister 12 are combusted by the internal combustion engine 20.

A fuel tank isolation valve 110 is connected in series between a vapor dome or headspace, i.e., the gaseous portion within the fuel tank 16, and a valve port 12v of the fuel vapor collection canister 12.

A vapor dome pressure level that is approximately 10" water above atmospheric pressure has been determined to suppress fuel vapor generation in the fuel tank 16. A fuel tank pressure sensor (not shown) can be used to detect pressures in excess of this determined level. When excess pressure is detected, the fuel tank isolation valve 110 is supplied an electrical signal from the engine control management computer 22 that results in the fuel tank isolation valve 110 opening to decrease pressure to or slightly below the determined level.

Figure 2:
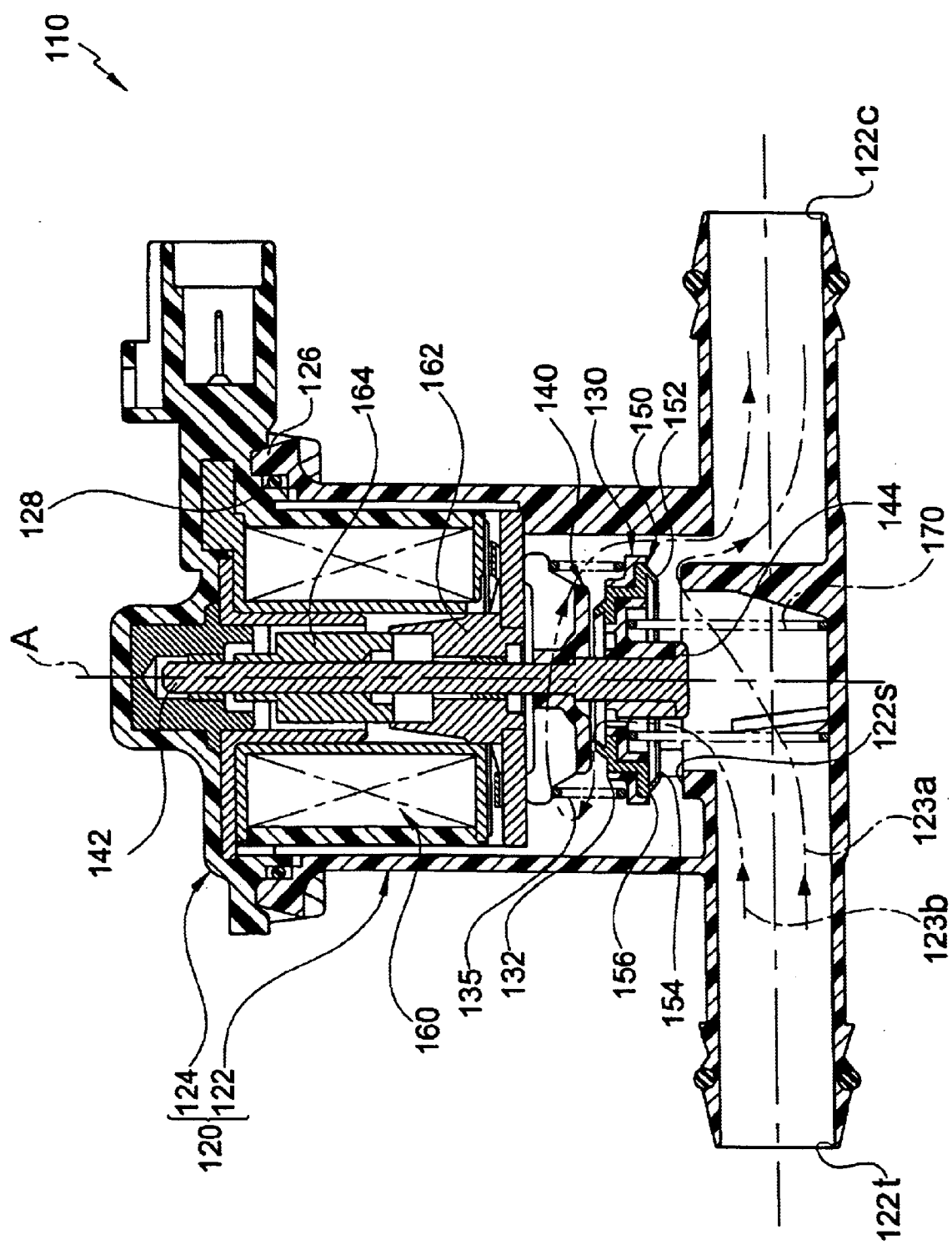
FIG. 2 is a sectional view of a dual-stage fuel tank isolation valve.

Referring additionally to FIG. 2, a first preferred embodiment of the fuel tank isolation valve 110 includes a housing 120, a valve assembly 130, 140, and a seal 150. The housing can include a body 122 and a cover 124. The body 122 and the cover 124 can be made of any material that is suitable for contacting and containing fuel and/or fuel vapor and for housing an actuator 160. The body 122 and the cover 124 can be made of different materials or the same material, as long as the material is suitable for its intended purpose. The body 122 and the cover 124 can be a homogenous whole or separate components coupled together. Preferably, the body 122 and the cover 124 are separate components coupled together by at interlocking flange assembly 126. Alternative coupling techniques can be substituted for the interlocking flange assembly 126. A rubber O-ring 128 can provide a fluid-tight seal between the body 122 and the cover 124. Alternative sealing means, e.g., a gasket, can be substituted for the O-ring 128. Preferably, the housing 120 is constructed as described above; however, the housing 120 can alternatively be constructed as two separate halves divided along a central longitudinal axis A.

The body 122 includes an inlet port 122t for ingress of fuel vapor from an evaporative emission space of the fuel tank 16 and an outlet port 122c for egress of fuel vapor to the fuel vapor collection canister 12. Fluid communication between the inlet port 122t, which is at an inlet pressure level, and the outlet port 122c, which is at an outlet pressure level, can be along a first fluid communication path 123a. Typically, the inlet pressure level is greater than ambient pressure, while the outlet pressure level is less than ambient pressure. The valve assembly 130,140 controls fluid flow along the first fluid communication path 123a. As used herein, the term "fluid" can refer to a gaseous phase, a liquid phase, or a mixture of the gaseous and liquid phases. The term "fluid" preferably refers to the gaseous phase of a volatile liquid fuel, e.g., a fuel vapor.

The valve assembly 130,140 is movable along the axis A with respect to the housing 120 between an open position, a closed position, and an intermediate position. The intermediate position is between the open and closed positions. As shown in FIG. 2, the open position permits substantially unrestricted fluid flow between the inlet and outlet ports 122t,122c. The closed position (not shown) substantially blocks fluid flow between the inlet and outlet ports 122t, 122c.

The open position, as shown in FIG. 2, permits substantially unrestricted fluid flow from the inlet port 122t to the outlet port 122c. In the open position, the valve assembly 130,140 is spaced from the body 122 such that fluid communication is permitted along the first fluid communication path 123a through a gap between the valve assembly 130, 140 and a sealing surface 122s of the body 122.

The closed position (not shown) substantially prevents fluid flow from the inlet port 122t to the outlet port 122c, and therefore isolates the fuel tank 16 from fluid communication with the rest of the evaporative emission control system 10. In the closed position (not shown), the seal 150 engages the sealing surface 122s of the body 112 such that the fluid communication along the first fluid communication path 123a is prevented. Moreover, fluid communication along a second fluid communication path 123b is prevented by a non-perforated valve element 140 of the valve assembly 130,140 occluding a perforated valve element 130 of the valve assembly 130,140. Preferably, the seal 150 sealingly engages the perforated and non-perforated valve elements 130,140 to prevent fluid communication through a gap between the perforated and non-perforated valve elements 130,140.

The non-perforated valve element 140 is fixed at an intermediate location of a shaft 142 that is displaced along the axis A by the actuator 160. A flange 144 at the end of the shaft 142 constrains relative movement of the perforated valve element 130 along the shaft 142. The perforated valve element 130 is slidable on the shaft 142 and biased toward the flange 144. Preferably, a coil spring 135, which can be centered around the axis A, extends between the perforated and non-perforated valve elements 130,140 to bias the perforated valve element 130 toward the flange 144.

To achieve the closed position, the valve assembly 130, 140 is displaced by the actuator 160 along the axis A toward the sealing surface 122s of the body 112. Initially the perforated and non-perforated valve elements 130,140 are displaced concurrently until the seal 150 on the perforated valve element 130 contacts the sealing surface 122s. Continued movement of the non-perforated valve element 140, the shaft 142, and the flange 144 compresses the coil spring 135 until the seal 150 on the perforated valve element 130 is contacted by the non-perforated valve element 140.

In the closed position, a rapid increase in fuel tank pressure, e.g., as a result of an impact that compresses the fuel tank 16, the valve assembly 130,140 provides a "blow-off" feature that permits fluid flow from the inlet port 122t to the outlet port 122c. This "blow-off" feature is activated when the inlet pressure at the inlet port 122t exceeds the actuating force of the actuator 160 acting on the valve assembly 130,140. When this occurs, the valve assembly 130,140 is displaced from the body 122 such that fluid communication is permitted through the gap between the valve assembly 130,140 and the sealing surface 122s.

The intermediate position (not shown) provides restricted fluid flow along the second fluid communication path 123b from the inlet port 122t to the outlet port 122c. In particular, the perforated valve element 130 includes at least one orifice 132 that is located radially inward of the seal 150. The total transverse cross-sectional area of the at least one orifice 132 is selected to permit fluid flow along the second fluid communication path 123b that is restricted relative to the first fluid communication path 123a.

To achieve the intermediate position, the valve assembly 130,140 is displaced by the actuator 160 only until the seal 150 on the perforated valve element 130 contacts the sealing surface 122s. Fluid flow along the first fluid communication path 123a is prevented and fluid flow along the second fluid communication path 123b is permitted. Thus, the only fluid flow between the inlet and outlet ports 122t,122c must pass through the at least one orifice 132, and through the gap between the perforated valve element 130 and the non-perforated valve element 140.

The seal 150 is located at an interface between the body 122 and the valve assembly 130,140. The seal 150 includes an annular extension 152 that projects obliquely with respect to the axis A in the open position. The annular extension 152 is preferably shaped as a hollow frustum. As shown, the annular extension 152 can include a transverse dimension that is generally constant with respect to the projection of the annular extension 152. The annular extension 152 can alternatively include a transverse dimension that tapers (not shown) with respect to the projection of the annular extension 152. In the case of the hollow frustum, an inner surface 154 of the hollow frustum generally confronts the axis A, and an outer surface 156 of the hollow frustum generally faces opposite the inner surface 154. The inner surface 154 is in fluid communication with the inlet port 122t when the valve assembly 130,140 is at the intermediate position. The outer surface 156 is in fluid communication with the outlet port 122c when the valve assembly 130,140 is at the intermediate position. When the inlet pressure is greater than the outlet pressure, the seal 150 is self-energizing between the intermediate and closed positions. Preferably, the seal 150 engages the sealing surface 122s of the body 122 in the closed and intermediate positions. The seal 150 is preferably molded on the perforated valve element 130, but can be include multiple pieces affixed to the perforated valve element 130, the non-perforated valve element 140, or the sealing surface 122s.

The actuator 160 can be an electromagnetic, piezoelectric, or any other type of actuator. Preferably, the actuator 160 is an electromagnetic solenoid actuator 160 that includes a stator 162 and an armature 164. The armature 164 is operatively connected to the shaft 142 and the stator 162 is fixed with respect to the housing 122, such that the armature 164 is displaceable along the axis A with respect to the stator 162. Preferably, at least one of the stator 162 and the cover 124 supports a bearing that guides the shaft 142.

A resilient element 170, preferably a coil spring that can be centered around the axis A, biases the valve assembly 130,140 toward the open position in opposition to the actuating force of the actuator 160. Thus, the open position is the normal and fail-safe modes of the valve 110. Preferably, the resilient element 170 extends between the perforated valve element 130 and an internal wall of the body 112. The resilient element 170 is selected to have a biasing rate, e.g., spring constant, which is lower than the resilient element 135 such that the actuator 160 compresses the resilient element 170 before the resilient element 135.

The actuator 160, which is preferably an electromagnetic solenoid, is operated by a signal supplied by the engine control management computer 22. This signal can be a constant current driver or a pulse-width-modulated signal. In the case of the pulse-width-modulated signal, at an approximately zero percent duty cycle, the fuel tank isolation valve 110 is in the open position, and at an approximately one hundred percent duty cycle, the fuel tank isolation valve 110 is in the closed position. Thus, when the actuator 160 is not energized, fluid communication is permitted along at least the first fluid communication path 123a. This provides the fail-safe mode such that excessive fuel vapor build-up is prevented in the fuel tank 16. Preferably, there is an approximately fifty percent duty cycle when the fuel tank isolation valve 110 is in the intermediate position.

Figure 3:
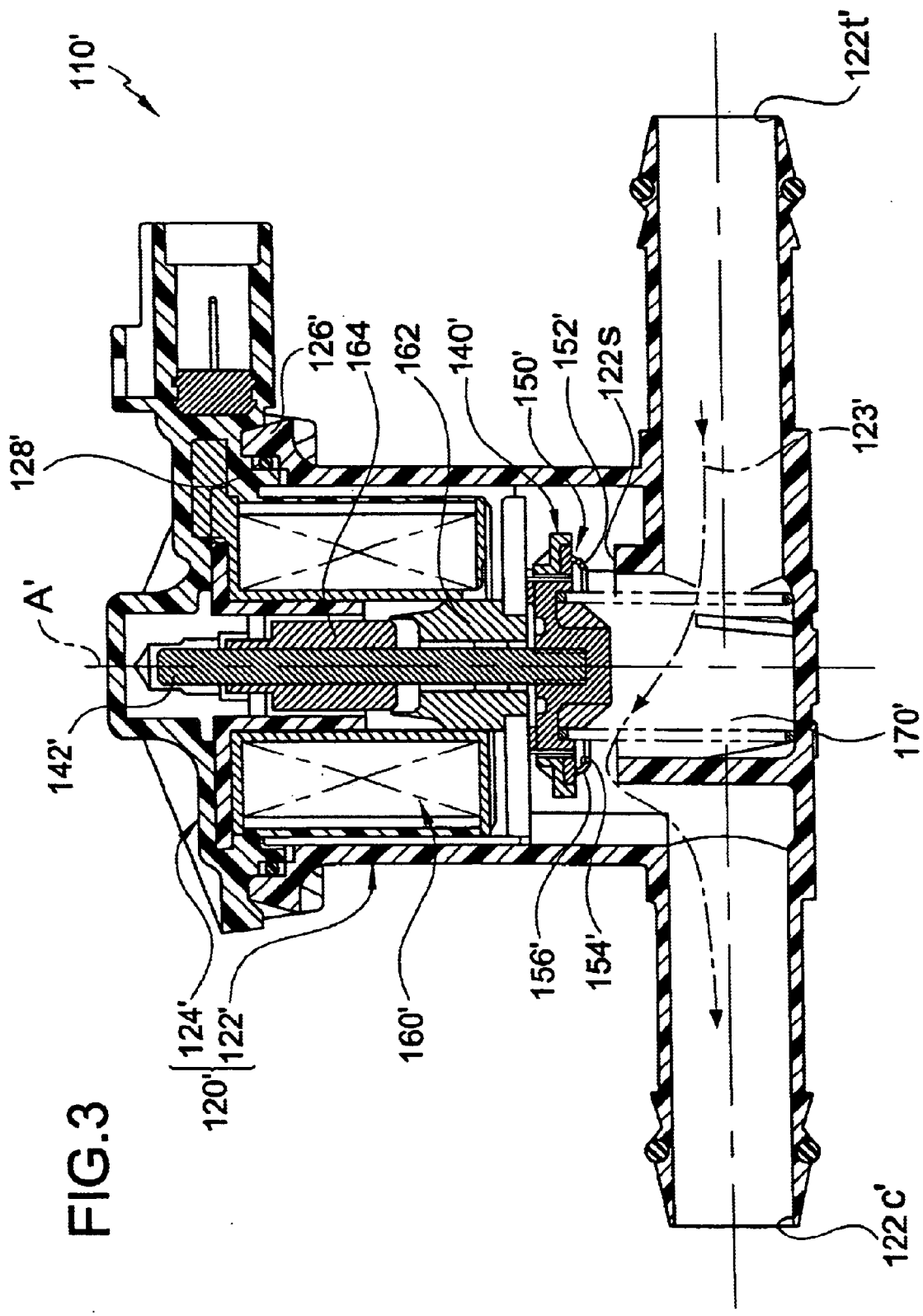
FIG. 3 is a sectional view of a single-stage fuel tank isolation valve.

Referring to FIG. 3, a second preferred embodiment of the fuel tank isolation valve 110' will now be described. The fuel tank isolation valve 110' includes a housing 120', a valve 140', and a seal 150'. The housing can include a body 122' and a cover 124'. The body 122' and the cover 124' can be made of any material that is suitable for contacting and containing fuel and/or fuel vapor and for housing an actuator 160'. The body 122' and the cover 124' can be made of different materials or the same material, as long as the material is suitable for its intended purpose. The body 122' and the cover 124' can be a homogenous whole or separate components coupled together. Preferably, the body 122' and the cover 124' are separate components coupled together by at interlocking flange assembly 126'. Alternative coupling techniques can be substituted for the interlocking flange assembly 126'. A rubber O-ring 128' can provide a fluid-tight seal between the body 122' and the cover 124'. Alternative sealing means, e.g., a gasket, can be substituted for the O-ring 128'. Preferably, the housing 120' is constructed as described above; however, the housing 120' can alternatively be constructed as two separate halves divided along a central longitudinal axis A'.

The body 122' includes an inlet port 122t' for ingress of fuel vapor from an evaporative emission space of the fuel tank 16 and an outlet port 122c' for egress of fuel vapor to the fuel vapor collection canister 12. Fluid communication between the inlet port 122t', which is at an inlet pressure level, and the outlet port 122c', which is at an outlet pressure level, can be along a fluid communication path 123'. Typically, the inlet pressure level is greater than ambient pressure, while the outlet pressure level is less than ambient pressure. The valve 140' controls fluid flow along the fluid communication path 123'.

The valve 140' is movable along the axis A' with respect to the housing 120' between an open position, a closed position, and an intermediate position. The intermediate position is between the open and closed positions. As shown in FIG. 3, the open position permits substantially unrestricted fluid flow between the inlet and outlet ports 122t', 122c'. The closed position (not shown) substantially blocks fluid flow between the inlet and outlet ports 122t',122c'.

The open position, as shown in FIG. 3, permits substantially unrestricted fluid flow from the inlet port 122t' to the outlet port 122c'. In the open position, the valve 140' is spaced from the body 122' such that fluid communication is permitted along the fluid communication path 123' through a gap between the valve 140' and a sealing surface 122s' of the body 122'.

The closed position (not shown) substantially prevents fluid flow from the inlet port 122t' to the outlet port 122c', and therefore isolates the fuel tank 16 from fluid communication with the rest of the evaporative emission control system 10. In the closed position (not shown), the seal 150' engages the sealing surface 122s' of the body 112' such that the fluid communication along the fluid communication path 123' is prevented. The valve 140' is fixed to a shaft 142' that is displaced along the axis A' by the actuator 160'.

To achieve the closed position, the shaft 142' and the valve 140' are displaced by the actuator 160' along the axis A' until the seal 150' on the valve 140' contacts the sealing surface 122s'.

In the closed position, a rapid increase in fuel tank pressure, e.g., as a result of an impact that compresses the fuel tank 16, the valve 140' provides a "blow-off" feature that permits fluid flow from the inlet port 122t' to the outlet port 122c'. This "blow-off" feature is activated when the inlet pressure at the inlet port 122t' exceeds the actuating force of the actuator 160' acting on the valve 140'. When this occurs, the valve 140' is displaced from the body 122' such that fluid communication is permitted through the gap between the valve 140' and the sealing surface 122s'.

The intermediate position (not shown) provides restricted fluid flow along the fluid communication path 123' from the inlet port 122t' to the outlet port 122c'.

To achieve the intermediate position, the valve 140' is displaced by the actuator 160' only until the seal 150' on the valve 140' closely approaches or initially contacts the sealing surface 122s'.

The seal 150' is located at an interface between the body 122' and the valve 140'. The seal 150' includes an annular extension 152' that projects obliquely with respect to the axis A' in the open position. The annular extension 152' is preferably shaped as a hollow frustum. As shown, the annular extension 152' can include a transverse dimension that is generally constant with respect to the projection of the annular extension 152'. The annular extension 152' can alternatively include a transverse dimension that tapers (not shown) with respect to the projection of the annular extension 152'. In the case of the hollow frustum, an inner surface 154' of the hollow frustum generally confronts the axis A', and an outer surface 156' of the hollow frustum generally faces opposite the inner surface 154'. The inner surface 154' is in fluid communication with the inlet port 122t' when the valve 140' is at the intermediate position. The outer surface 156' is in fluid communication with the outlet port 122c' when the valve 140' is at the intermediate position. When the inlet pressure is greater than the outlet pressure, the seal 150' is self-energizing between the intermediate and closed positions. Preferably, the seal 150' closely approaches or initially contacts the sealing surface 122s' of the body 122' in the closed and intermediate positions. The seal 130 deforms in response to a differential between the first and second pressure levels, such that at the intermediate position, there is a restricted, i.e., reduced, flow between the first and second ports 120,122. The deforming of the seal 130 can include fluttering in response to the differential between the inlet and outlet pressure levels. The seal 150' is preferably molded on the valve 140', but can be include multiple pieces affixed to the valve 140' or the sealing surface 122s'.

The actuator 160' can be an electromagnetic, piezoelectric, or any other type of actuator. Preferably, the actuator 160' is an electromagnetic solenoid actuator 160' that includes a stator 162' and an armature 164'. The armature 164' is operatively connected to the shaft 142' and the stator 162' is fixed with respect to the housing 122', such that the armature 164' is displaceable along the axis A' with respect to the stator 162'. Preferably, at least one of the stator 162' and the cover 124' supports a bearing that guides the shaft 142'.

A resilient element 170', preferably a coil spring that can be centered on the axis A', biases the valve 140' toward the open position in opposition to the actuating force of the actuator 160'. Thus, the open position is the normal and fail-safe modes of the valve 110'. Preferably, the resilient element 170' extends between the valve 140' and an internal wall of the body 112'.

The actuator 160', which is preferably an electromagnetic solenoid, is operated by a signal supplied by the engine control management computer 22. This signal can be a constant current driver or a pulse-width-modulated signal. In the case of the pulse-width-modulated signal, at an approximately zero percent duty cycle, the fuel tank isolation valve 110' is in the open position, and at an approximately one hundred percent duty cycle, the fuel tank isolation valve 110' is in the closed position. Thus, when the actuator 160' is not energized, fluid communication is permitted along the fluid communication path 123'. This provides the fail-safe mode such that excessive fuel vapor build-up is prevented in the fuel tank 16. Preferably, there is an approximately fifty percent duty cycle when the fuel tank isolation valve 110' is in the intermediate position.

The fuel tank isolation valves 110 and 110' provide low flow restriction during fuel tank re-fueling (i.e., in the open position), fail to an open state (i.e., the open position), and provide restricted flow during routine vehicle operation to ensure that a sufficient vapor pressure is maintained to suppress additional fuel vapor generation (i.e., the intermediate position). During purging of fuel vapor collection canister 12 (i.e., the closed position), excess hydrocarbons stored in the fuel vapor collection canister 12 are purged to the internal combustion engine 20. Thus, fuel tank isolation valves 110 and 110' isolate the fuel tank 16, thereby preventing purging directly from the vapor dome of the fuel tank 16.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system for controlling evaporative emissions of a volatile fuel, the system comprising:

a fuel vapor collection canister including a supply port and a discharge part;

a purge valve including an inlet port and an, outlet port, the inlet port of the purge valve being in fluid communication with the discharge port of the fuel vapor collection canister;

an isolation valve including:
- a housing having a first port in fluid communication with the supply port of the fuel vapor collection canister, a second port, and a fuel vapor flow path extending between the first and second ports;
- a valve body movable with respect to the housing, the valve body being movable along an axis between a first configuration and a second configuration, the first configuration permitting substantially unrestricted fuel vapor flow between the first and second ports, and the second configuration substantially preventing fuel vapor flow between the first and second ports anytime the purge valve is purging the fuel vapor collection canister; and
- a seal being located at an interface between the housing and the valve body, the seal including an annular lip projecting obliquely toward the axis in the first configuration; and a fuel tank being in fluid communication with the second port of the isolation valve.

2. The system according to claim 1, further comprising: an internal combustion engine having an intake manifold in fluid communication with the outlet port of the purge valve.

3. The system according to claim 2, wherein the internal combustion engine draws fuel vapor from the fuel vapor collection canister when the isolation valve is in the second configuration.

4. A system for controlling evaporative emissions of a volatile fuel, the system comprising:
- a fuel vapor collection canister including a supply port and a discharge port;
- a purge valve including an inlet port and an outlet port, the inlet port of the purge valve being in fluid communication with the discharge port of the fuel vapor collection canister;
- an isolation valve including:
  - a housing having a first port in fluid communication with the supply port of the fuel vapor collection canister, a second port, and a fuel vapor flow path extending between the first and second ports;
  - a valve body movable with respect to the housing, the valve body being movable along an axis between a first configuration and a second configuration, the first configuration permitting substantially unrestricted fuel vapor flow between the first and second ports, and the second configuration substantially preventing fuel vapor flow between the first and second ports; and
  - a seal being located at an interface between the housing and the valve body, the seal including an annular lip projecting obliquely toward the axis in the first configuration;
- a fuel tank being in fluid communication with the second port of the isolation valve; and
- an internal combustion engine having an intake manifold in fluid communication with the outlet port of the purge valve;
- wherein the internal combustion engine draws fuel vapor from the fuel vapor collection canister when the isolation valve is in the second configuration, and fuel vapor flow through the purge valve is prevented when the isolation valve is in the first configuration.

5. A system for controlling evaporative emissions of a volatile fuel, the system comprising:
- a fuel vapor collection canister including a supply port and a discharge port;
- a purge valve including an inlet port and an outlet port, the inlet port of the purge valve being in fluid communication with the discharge port of the fuel vapor collection canister;
- an isolation valve including:
  - a housing having a first port in fluid communication with the supply port of the fuel vapor collection canister, a second port, and a fuel vapor flow path extending between the first and second ports;
  - a valve body movable with respect to the housing, the valve body being movable along an axis between a first configuration and a second configuration, the first configuration permitting substantially unrestricted fuel vapor flow between the first and second ports, and the second configuration substantially preventing fuel vapor flow between the first and second ports; and
  - a seal being located at an interface between the housing and the valve body, the seal including an annular lip projecting obliquely toward the axis in the first configuration; and
- a fuel tank being in fluid communication with the second port of the isolation valve;
- wherein fuel vapor accumulates in the fuel vapor collection canister when the isolation valve is in the first configuration.

6. A system for controlling evaporative emissions of a volatile fuel, the system comprising:
- a fuel vapor collection canister including a supply port and a discharge port;
- a purge valve including an inlet port and an outlet port, the inlet port of the purge valve being in fluid communication with the discharge port of the fuel vapor collection canister;
- an isolation valve including:
  - a housing having a first port in fluid communication with the supply port of the fuel vapor collection canister, a second port, and a fuel vapor flow path extending between the first and second ports;
  - a valve body movable with respect to the housing, the valve body being movable along an axis between a first configuration and a second configuration, the first configuration permitting substantially unrestricted fuel vapor flow between the first and second ports, and the second configuration substantially preventing fuel vapor flow between the first and second ports; and
  - a seal being located at an interface between the housing and the valve body, the seal including an annular lip projecting obliquely toward the axis in the first configuration; and
- a fuel tank being in fluid communication with the second port of the isolation valve;
- wherein fuel vapor flow through the purge valve is permitted when the isolation valve is in the second configuration.

7. A system for controlling evaporative emissions of a volatile fuel, the system comprising:
- a fuel vapor collection canister including a supply port and a discharge port;
- a purge valve including an inlet port and an outlet port, the inlet port of the purge valve being in fluid communication with the discharge port of the fuel vapor collection canister;

an isolation valve including:
  a housing having a first port in fluid communication with the supply port of the fuel vapor collection canister, a second port, and a fuel vapor flow path extending between the first and second ports;
  a valve body movable with respect to the housing, the valve body being movable alone an axis between a first configuration and a second configuration, the first configuration permitting substantially unrestricted fuel vapor flow between the first and second ports, and the second configuration substantially preventing fuel vapor flow between the first and second ports; and
  a seal being located at an interface between the housing and the valve body, the seal including an inner surface of an annular lip projecting obliquely toward the axis and toward a sealing surface in the first configuration;

a fuel tank being in fluid communication with the second port of the isolation valve; and a processor in electrical communication with the purge valve and with the isolation valve, the processor coordinating operation of the purge and isolation valves.

8. A system for controlling evaporative emissions of a volatile fuel, the system comprising:
  a fuel vapor collection canister including a supply port and a discharge port;
  a purge valve including an inlet port and an outlet port, the inlet port of the purge valve being in fluid communication with the discharge port of the fuel vapor collection canister;
  an isolation valve including:
    a housing having a first port in fluid communication with the supply port of the fuel vapor collection canister, a second port, and a fuel vapor flow path extending between the first and second ports;
    a valve body movable with respect to the housing, the valve body being movable along an axis between a first configuration, a second configuration, and an intermediate configuration between the first and second configurations, the first configuration permitting substantially unrestricted fuel vapor flow between the first and second ports, the second configuration substantially preventing fuel vapor flow between the first and second ports, and the intermediate configuration providing restricted fuel vapor flow between the first and second ports; and
    a seal being located at an interface between the housing and the valve body, the seal including an annular lip projecting obliquely toward the axis in the first configuration; and
  a fuel tank being in fluid communication with the second port of the isolation valve.

9. The system according to claim 8, wherein the valve body comprises:
  a first valve element including a second fluid communication passage providing the restricted fuel vapor flow between the first and second ports; and
  a second valve element positionable between first and second arrangements with respect to the first valve element, the first arrangement of the second valve element being spaced from the first valve element in the intermediate configuration of the valve, and the second arrangement of the second valve engaging the first valve element in the second configuration of the valve body.

10. The system according to claim 9, wherein the isolation valve comprises:
  a first spring biasing the valve body toward the first configuration; and
  a second spring biasing the first and second valve members toward the first arrangement, the second spring having a relatively greater spring rate than the first spring.

11. The system according to claim 10, wherein the isolation valve comprises:
  an electromagnetic solenoid displacing the valve body against the bias of the first spring.

12. The system according to claim 8, wherein the isolation valve supplies fuel vapor flow at a first pressure to the fuel vapor collection canister and receives fuel vapor flow at a second pressure level from the fuel tank, and the seal deforms in response to a differential between the first and second pressure levels such that at the intermediate position there is restricted fluid flow between the first and second ports.

13. The system according to claim 12, wherein the seal deforming comprises the annular lip fluttering in response to the differential between the first and second pressure levels.

14. The system according to claim 8, wherein the annular lip defines a hollow frustum having an inner surface, an outer surface, and a tip disposed between the inner and outer surfaces, the inner surface being in fuel vapor communication with the second port when the tip contacts the housing of the isolation valve, and the outer surface being in fuel vapor communication with the first port when the tip contacts the housing of the isolation valve.

15. The system according to claim 8, further comprising:
  a processor supplying an electrical signal to the isolation valve, the electric signal having:
    an approximately zero percent power level when the valve body is in the first configuration;
    an approximately fifty percent power level when the valve body is in the intermediate position; and
    an approximately one hundred percent power level when the valve body is in the second configuration.

16. A system for controlling evaporative emissions of a volatile fuel, the system comprising:
  a fuel vapor collection canister including a supply port and a discharge port;
  a purge valve including an inlet port and an outlet port, the inlet port of the purge valve being in fluid communication with the discharge port of the fuel vapor collection canister;
  a fuel tank; and
  means for isolating the fuel tank from the purge valve anytime there is fluid flow between the inlet and outlet ports of the purge valve.

17. The system according to claim 16, wherein the means for isolating comprises:
  an isolation valve in a fluid communication path coupling the fuel tank to the vapor collection canister.

18. The system according to claim 17, wherein the isolation valve comprises:
  a housing having a first port in fluid communication with the supply port of the fuel vapor collection canister, a second port, and a fuel vapor flow path extending between the first and second ports;
  a valve body movable with respect to the housing, the valve body being movable along an axis between a first configuration and a second configuration, the first configuration permitting substantially unrestricted fuel vapor flow between the first and second port, and the second configuration substantially preventing fuel vapor flow between the first and second ports; and a seal being located at an interface between the housing and the valve body.

19. The system according to claim 17, wherein the isolation valve comprises:

a housing;

a valve body movable with respect to the housing, the valve body is movable between first and second configurations, the first configuration permits substantially unrestricted fuel vapor flow through the housing, and the second configuration substantially prevents fuel vapor flow through the housing; and a seal being located at an interface between the housing and the valve body.

20. The system according to claim 19, wherein the means for isolating comprises:

a controller operatively coupled to the isolation and purge valves, the controller coordinates operation of the isolation and purge valves.

21. A method for controlling evaporative emissions of a volatile fuel, the volatile fuel, being stored in a fuel tank and combusted in an internal combustion engine, the method comprising:

accumulating fuel vapor in a fuel vapor collection canister;

providing an isolation valve in a first conduit providing fuel vapor communication between the fuel tank and the fuel vapor collection canister;

providing a purge valve in a second conduit providing fuel vapor communication between the fuel vapor collection canister and the internal combustion engine; and isolating the fuel tank from the fuel vapor collection canister at anytime while purging the fuel vapor collection canister, the isolating including the isolation valve substantially preventing fuel vapor flow through the first conduit, and the purging including the purge valve permitting generally unrestricted fuel vapor flow through the second conduit.

22. A method for controlling evaporative emissions of a volatile fuel, the volatile fuel being stored in a fuel tank and combusted in an internal combustion engine, the method comprising:

accumulating fuel vapor in a fuel vapor collection canister;

providing an isolation valve in a first conduit providing fuel vapor communication between the fuel tank and the fuel vapor collection canister;

providing a purge valve in a second conduit providing fuel vapor communication between the fuel vapor collection canister and the internal combustion engine;

isolating the fuel tank from the fuel vapor collection canister while purging the fuel vapor collection canister, the isolating including the isolation valve substantially preventing fuel vapor flow through the first conduit, and the purging including the purge valve permitting generally unrestricted fuel vapor flow through the second conduit;

connecting the fuel tank to the fuel vapor collection canister during the accumulating, the connecting including the isolation valve permitting fuel vapor flow through the first conduit; and disconnecting the fuel vapor collection canister from the internal combustion engine during the accumulating, the disconnecting including the purge valve substantially preventing fuel vapor glow through the second conduit.

23. The method according to claim 22, the connecting comprising permitting generally unrestricted fuel vapor flow through the first conduit to relieve a rapid increase in fuel tank pressure above a set pressure level, and permitting relatively restricted fuel vapor flow through the first conduit to generally maintain the fuel tank pressure at the set pressure level.

24. The method according to claim 23, wherein the set pressure level is selected from within a range between five and fifteen inches of water above ambient pressure.

25. The method according to claim 24, wherein the set pressure level comprises approximately ten inches of water above ambient pressure.

* * * * *